Feb. 2, 1965   C. E. MIESIAK   3,167,960
TEMPERATURE PROBE
Filed Aug. 7, 1961
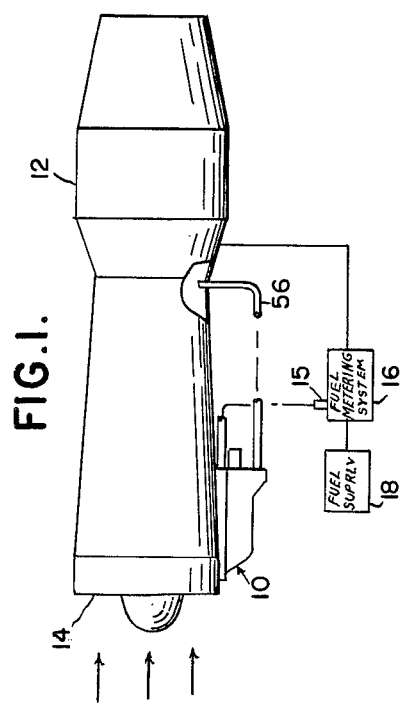
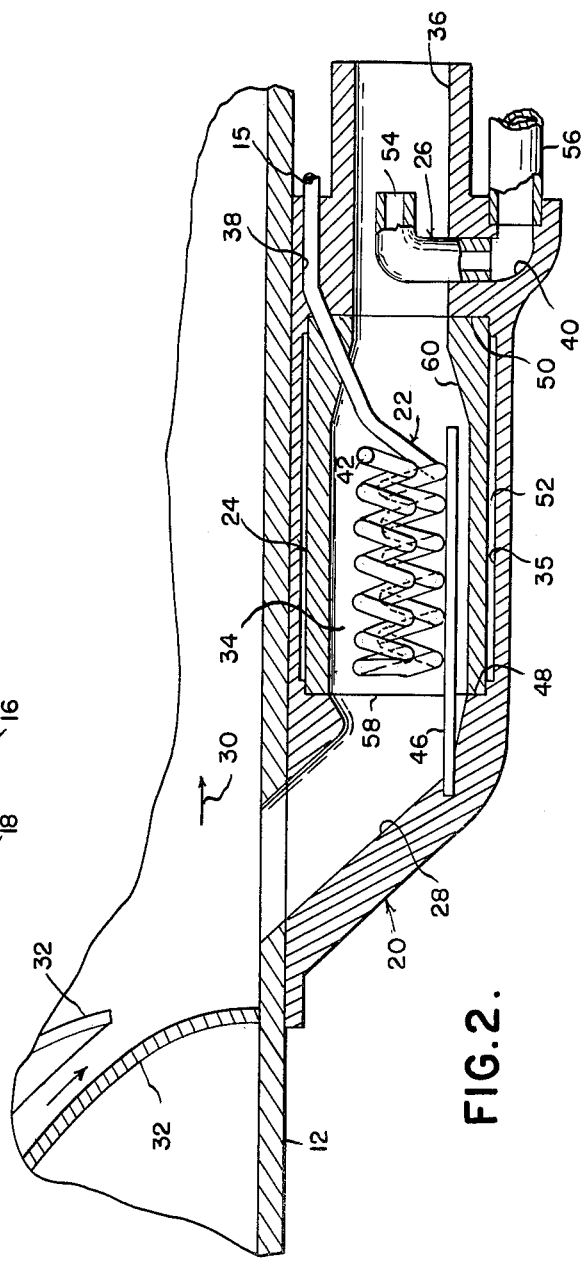
INVENTOR.
CONRAD E. MIESIAK
BY Whittemore
Hulbert & Belknap
ATTORNEYS United States Patent Office 3,167,960
Patented Feb. 2, 1965

3,167,960
TEMPERATURE PROBE
Conrad E. Miesiak, Detroit, Mich., assignor to Holley
Carburetor Company, Warren, Mich., a corporation of
Michigan
Filed Aug. 7, 1961, Ser. No. 129,871
6 Claims. (Cl. 73—349)

The invention relates to a temperature probe and refers more specifically to a temperature responsive element for mounting on a gas turbine engine or similar device in a position out of the main air intake passage thereof which is adapted to provide rapid accurate response to temperature changes.

Temperature probes have long been used to sense temperature of inlet air supplied to gas turbine engines for purposes of controlling engine operation. In the past these probes have usually been positioned directly in the main air intake passage of the engine and were therefore subject to damage caused by the impact of incoming air and foreign matter carried thereby. Further such placement of the temperature probe provided an obstruction in the air intake passage which reduced the efficiency of the turbine engine. Prior attempts to locate the temperature probe in a location remote from the main air intake passage have been generally unsuccessful in that response to air temperature has not been sufficiently rapid in such installations.

It is therefore an object of the present invention to provide a temperature probe for use with gas turbine engines and similar devices mounted out of the main air intake passage and having a rapid response to temperature changes.

Another object is to provide a temperature probe for use in conjunction with gas turbine engines or similar devices comprising a housing mounted in a location remote from the main air intake passage of the device, a temperature sensing element mounted within the housing, means within the housing for insulating the temperature sensing element from engine temperatures, means for deflecting air from the main air intake passage into the housing providing air flow past the temperature sensing element, and means for insuring the air flow past the temperature sensing element is maintained at a minimum at low engine power settings.

Another object is to provide a temperature probe as set forth above wherein the housing includes an air intake passage connected to the main air intake passage of the device, an enlarged chamber in which the temperature sensing element is mounted, an exhaust passage and transition areas between the passages and chamber to provide for smooth flow of air therethrough.

Another object is to provide a temperature probe as set forth above wherein the means for insulating the temperature sensing element from engine temperatures comprises a heat conductive insulating fiber glass sleeve positioned within the enlarged chamber and a polished heat reflective radially inner chamber surface.

Another object is to provide a temperature probe as set forth above wherein the temperature sensing element comprises a double wound tube having right and left hand portions in which each individual coil alternately overlaps the other.

Another object is to provide a temperature probe as set forth above wherein the means for insuring the air flow past the temperature sensing element is maintained at a minimum at low engine power settings comprises an aspirating tube in the outlet passage connected to a pressure source, such as engine compressor discharge pressure.

Another object is to provide a temperature probe which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation of a turbine engine including a temperature probe constructed in accordance with the invention and a fuel supply system in combination therewith.

FIGURE 2 is a longitudinal section view of the temperature probe illustrated in FIGURE 1.

With particular reference to the figures of the drawing one embodiment of the temperature probe of the invention will now be disclosed.

As shown in FIGURE 1 the temperature probe, generally indicated 10, is secured to a turbine engine 12 adjacent the air intake end 14 thereof and is operable to sense the temperature of air drawn into the turbine engine 12 to provide a response through capillary tube 15 effective in fuel metering system 16 to regulate the quantity of fuel metered from fuel supply tank 18 to the engine 12.

The temperature probe 10 comprises a housing 20 secured to engine 12 by convenient means (not shown) having the temperature sensing element 22 mounted therein and means for deflecting air from the main air intake passage of the engine through the housing 20. A heat conducting insulating sleeve 24, which is formed to facilitate the passage of air therethrough, is mounted in housing 20 to protect the temperature sensing element 22 from undesirable heating effects due to its mounting on the engine 12.

The aspirating means 26 is mounted in the housing exhaust passage 36 as shown to draw the minimum of air through the probe 10 at low power settings at which time little air is available at the air inlet to the probe due to the ram effect of the engine. At higher power settings the major portion of flow through the probe is due to the engine ram effect. The aspirator effect is used to compensate for marginal ram effect.

More specifically, housing 20, as shown best in FIGURE 2, includes the air inlet passage 28 extending at an angle to the normal direction of flow of air through engine 12 indicated by arrow 30. Air from the intake end 14 of the turbine engine 12 is deflected into inlet passage 28 of the housing 20 by means of the stationary fixed guide vanes 32 if they are present in the turbine engine 12 to initially direct the air into the compressor at the proper angle.

The enlarged diameter chamber 34 of housing 20 is provided to receive the sleeve 24 as shown best in FIGURE 2. The radially inner surface 35 of the steel shell or housing 20 defining the enlarged diameter chamber 34 may be polished to provide a heat reflecting surface for insulating the temperature sensing element 22. Housing 20 may of course be made in sections and connected together by convenient means (not shown) so as to allow economical production thereof and the installation of sleeve 30 therein.

The outlet passage 36 of the housing 20 is of a cross section to provide the desired aspirating effect at low engine power settings. Opening 38 is provided in housing 20, as shown in FIGURE 2, adjacent the outlet passage 36 through which the temperature sensing element 22 extends into chamber 34. Similarly the passage 40 is provided in housing 20 through which air under pressure is supplied to the outlet passage 36, as will be considered in more detail subsequently.

As shown best in FIGURE 2 the temperature sensing element 22 comprises a capillary tube 15 extending through the passage 38 in housing 20 terminating within the chamber 34 in coil 42. Coil 42 is a double wound helical coil having both right and left hand wound portions in which each of the individual convolutions overlap, as best shown in FIGURE 2. Such overlapping construction permits a greater amount of surface area to be exposed to a given volume of air passing through housing 20 for a given coil and chamber size. This results in a more rapid temperature response which is essential in remotely located temperature probes.

The coil 42 and tube 15 are filled with suitable temperature sensitive material, such as normal butyl alcohol or paracymene which provides a temperature responsive signal for use in the fuel metering system 16 in which the capillary tube 15 terminates. The coil 42 is supported within chamber 34 by means of supporting member 46 which is secured to housing 20 as shown.

Sleeve 24 which may be constructed of fiber glass is secured in position in housing 20 at opposite ends in the recesses 48 and 50 provided in the housing 20. Sleeve 24 being constructed of fiber glass or similar material is a heat insulator and is heat conductive. Sleeve 24 is provided to isolate the coil 42 from heat other than that provided by air passing through housing 20. In this connection it will be noted that sleeve 24 is of smaller external diameter than the internal diameter of chamber 34 whereby an annular dead air space 52 is provided therebetween to further heat insulate the temperature sensitive element 22.

The means 26 for maintaining the air flow past the temperature sensing element at a minimum at low engine power settings comprises a fitting 54 communicating with the passage 40 in the housing 20 and terminating centrally of the outlet passage 36 of the housing 20 to provide means for feeding air under pressure from conduit 56 into the outlet passage 36. Conduit 56 is connected between the discharge side of the compressor of engine 12 and the temperature probe 10, as shown best in FIGURE 1. The conduit 56 may terminate in the engine combustion chamber instead of at the discharge side of the compressor if desired, however the cleaner high pressure air at the discharge side of the compressor is preferred since connection to the combustion chamber would invite clogging of conduit 56 by combustion products.

Thus in operation air enters the intake end 14 of the turbine engine 12 and a portion of the air is deflected by means of vanes 32 into the intake passage 28 of the housing 20. The air then passes over the coil 42 of the temperature sensing element 22 to provide a rapid temperature response necessary for proper fuel metering to the turbine engine 12. It will be particularly noted that the internal diameter of the sleeve 24 is enlarged at the end 58 thereof and tapers gradually at the end 60 to an area equal to area of the outlet passage 36. Thus as the air passes through chamber 34 it is not impeded by the volume of the coil 42 in the manner in which it would be if the internal diameter of the sleeve were of the same area as the input passage 28 of the housing 20. With such construction the air is allowed to move through the housing 20 at a substantially constant rate. Introduction of gases under pressure into the outlet passage 36 of the housing 20 through fitting 54 will have an aspirating effect. The aspirating effect is of importance in drawing a minimum of air through the probe at low engine power settings as previously indicated.

While but a single embodiment of the present invention has been disclosed it will be understood that modifications thereof are contemplated. It is the intention to include all modifications of the disclosed structure which suggest themselves to those persons skilled in the art within the scope of the invention. Further, it is not intended to limit the position of the temperature probe to that shown; rather it can be placed wherever it is most advantageous considering the equipment with which it is to be used.

The drawings and the foregoing specification constitute a description of the improved temperature probe in such full, clear, concise and exact terms as to enable any person skilled in the art to practice the invention, the scope of which is indicated by the appended claims.

What I claim as my invention is:

1. A temperature probe for use with a gas turbine engine or similar device, comprising a housing operably associated with the device and having a chamber therein for housing a temperature sensing element, said housing also having air intake and exhaust passages therein leading to and from the chamber, means positioned adjacent the air intake passage for deflecting air drawn into the device into the air intake passage through the chamber and out of the exhaust passage and a temperature sensing element comprising a continuous tubular coil having a temperature sensitive media therein which includes both right and left hand wound portions mounted in said chamber for sensing the temperature of air passed therethrough.

2. Structure as set forth in claim 1 wherein the individual convolutions of the right and left hand wound portions of the tubular coil are overlapped for approximately half of the diameter of the coil.

3. Structure as set forth in claim 1 and further including a sleeve of heat insulating material secured within the chamber surrounding the temperature sensing element.

4. Structure as set forth in claim 3 wherein an air space is provided between the radially outer surface of the sleeve and the radially inner surface of the chamber and the radially inner surface of the chamber is polished to reflect heat.

5. A temperature probe for use with a gas turbine engine or similar device, comprising a housing secured to the device and having a chamber therein for housing a temperature sensing element, said housing also having air intake and exhaust passages therein leading to and from the chamber, means positioned adjacent the air intake passage for deflecting air drawn into the device into the air intake passage through the chamber and out of the exhaust passage, a heat insulating sleeve secured within said chamber providing an air space between the radially outer diameter of said sleeve and the radially inner diameter of said chamber and a temperature sensing element mounted in said chamber within said sleeve for sensing the temperature of air passed therethrough.

6. A temperature probe for use with a gas turbine engine or similar device, comprising a housing secured to the device and having a chamber therein for housing a temperature sensing element, said housing also having air intake and exhaust passages therein leading to and from the chamber, means positioned adjacent the air intake passage for deflecting air drawn into the device into the air intake passage through the chamber and out of the exhaust passage, a temperature sensing element mounted in said chamber for sensing the temperature of air passed therethrough comprising a continuous tubular coil filled with a temperature sensing media having both right and left hand wound portions with the individual convolutions of the right and left hand wound portions overlapping, a heat insulating sleeve secured within said chamber providing an air space between the chamber surface and the sleeve outer surface, the cross sectional area of the sleeve opening minus the area occupied therein by the temperature sensing element being substantially equal to that of the intake passage and the surface of the intake passage and inner surface of the sleeve being formed to provide a smooth transition between the intake passage and sleeve and the sleeve and exhaust passage and means positioned within the exhaust passage of the housing for maintaining a minimum air flow through the chamber.

References Cited in the file of this patent

UNITED STATES PATENTS 2,741,919    Gaubatz _____ Apr. 17, 1956
3,034,583    Best _____ May 15, 1962

FOREIGN PATENTS 413,619    Great Britain _____ 1934

OTHER REFERENCES

Publication bulletin No. 100 (1944), Bridgeport Thermostat Company, a chart on page 27 relied on.